Oct. 30, 1962 — M. M. MONTGOMERY — 3,061,110
CARGO CONTAINER HANDLING EQUIPMENT

Filed March 23, 1961 — 2 Sheets-Sheet 1

INVENTOR.
MURRAY M. MONTGOMERY
BY
Bruce & Brosler
HIS ATTORNEYS.

Oct. 30, 1962   M. M. MONTGOMERY   3,061,110
CARGO CONTAINER HANDLING EQUIPMENT
Filed March 23, 1961   2 Sheets-Sheet 2
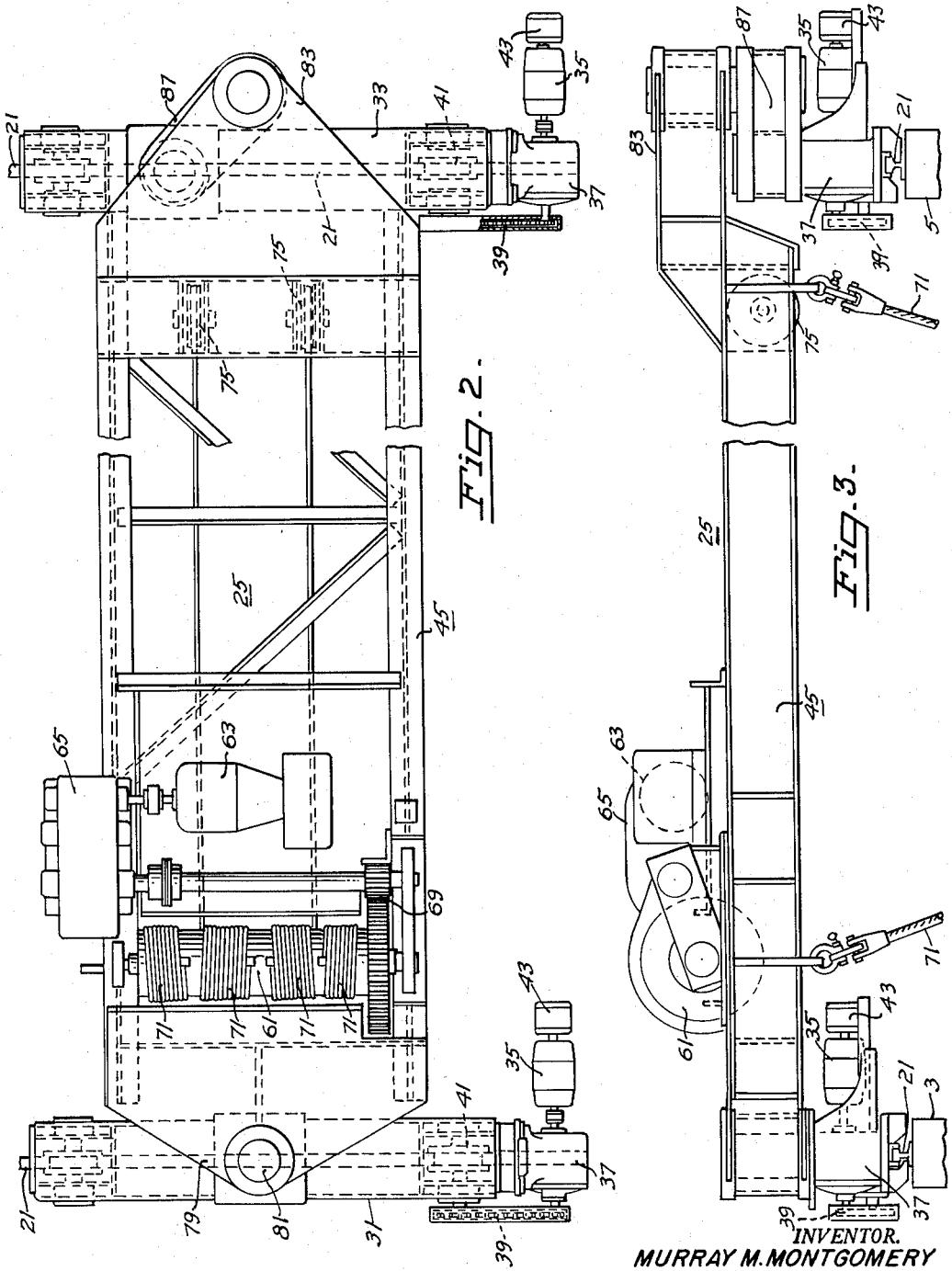
INVENTOR.
MURRAY M. MONTGOMERY
BY
Bruce & Brosler
HIS ATTORNEYS.

United States Patent Office 3,061,110
Patented Oct. 30, 1962

3,061,110
CARGO CONTAINER HANDLING EQUIPMENT
Murray M. Montgomery, Oakland, Calif., assignor to Pacific Coast Engineering Company, a corporation of California
Filed Mar. 23, 1961, Ser. No. 97,834
6 Claims. (Cl. 212—14)

My invention relates to the movement of freight and the like, and more particularly to cargo container handling equipment, and in its preferred embodiment it will be described from the viewpoint of its application to the loading or unloading of such cargo containers from the flat beds of a string of freight cars, though the invention is not limited in its application to such use.

In the loading or unloading of containers from a string of cars of a train, the containers may be transferred from trucks alongside the trucks to the cars of the train, or vice versa from the train cars to the trucks, in either case, for continued movement of such cargo containers toward their ultimate destinations.

Where such a container is transferred with its longitudinal axis fixed as to direction, a truck will have to be maneuvered to a position alongside a car and with its longitudinal axis paralleling that of the car. This creates quite an operation, as such trucks must, of necessity, be of the heavy duty type involving three or more axles, and probably trailers, and the problem becomes even more aggravated should there be activity in the proximity of adjacent cars.

By the present invention, this problem has been considerably simplified by making it conveniently possible to load and unload such trucks when parked at an angle to the cars, to or from which the cargo containers are to be transferred. This means that a truck may be driven into and out of position with respect to any of the cars of the train with ease, and regardless of similar activity taking place with respect to adjacent cars of such train.

Among the objects of my invention are:

(1) To provide novel and improved cargo container handling equipment;

(2) To provide novel and improved cargo container handling equipment which permits of angularly adjusting the orientation of a cargo container while such container is maintained under stable suspension;

(3) To provide novel and improved cargo container handling equipment which permits both angular adjustment of the orientation of a cargo container in space and transitory movement of such container from one area to another.

Additional objects of my invention will be brought out in the following description of a preferred embodiment of the same taken in conjunction with the accompanying drawings wherein:

FIG. 2 is a plan view of a trolley assembly involved in the equipment of FIG. 1 and FIG. 3 is a side view in elevation of the trolley assembly of FIG. 2.

Figure 1:
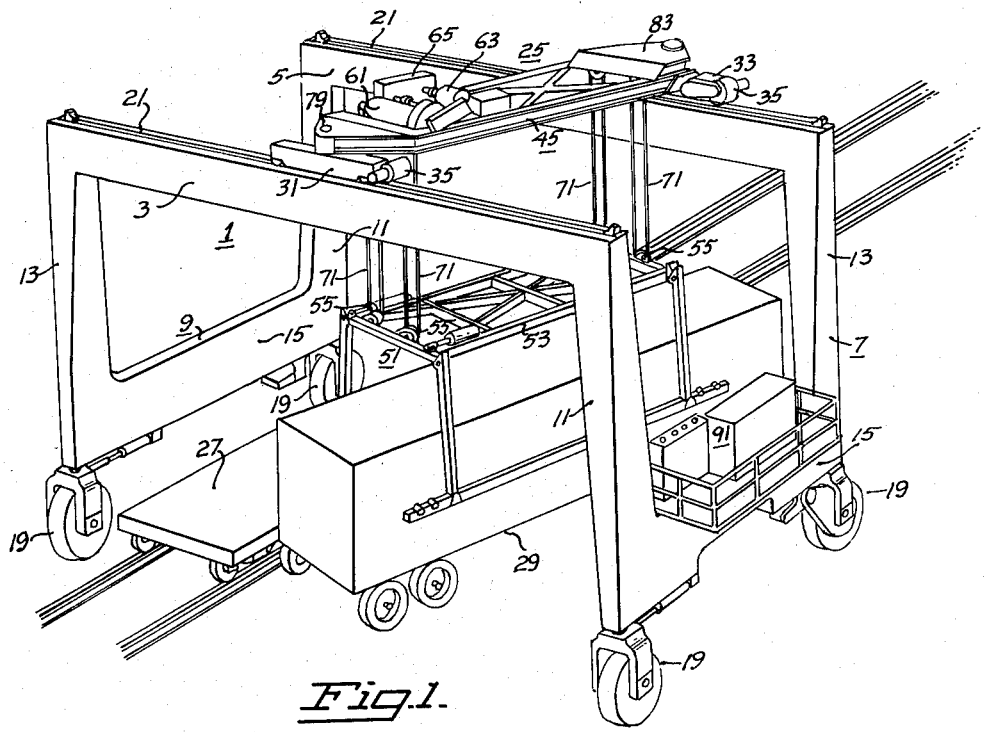
FIG. 1 is a three dimensional view of cargo container handling equipment of the present invention.

Referring to the drawings for details of my invention in its preferred form, the same involves the use of a gantry type crane 1 adapted to span the area within which activity is to take place, such area in the present instance involving that area occupied by the railroad right-of-way and the strip area immediately adjacent thereto and paralleling the same.

The gantry type crane may be of any conventional type, the specific crane illustrated having spaced parallel girders 35 of a length sufficient to span the area of activity, said girders being supported on the upper ends of U-shaped frames 7, 9, each of which frames includes upright legs 11, 13 connected at substantially their lower ends by a cross beam 15.

The crane is supported on corner wheels 19, certain or all of which may be driven to enable the crane to move under its own power.

Each of the girders 3 and 5 is provided with a rail 21, the two rails together comprising a track for the supporting of a trolley assembly 25 for movement along the girders between a position over a freight car 27 or carrier on the railroad right-of-way and a position over the area alongside such carrier, such latter area conceivably being occupied by a truck or trailer 29.

Said trolley assembly may comprise a pair of wheeled trucks 31, 33, one on each rail and driven by an electric motor 35 carried thereby and in drive connection through a gear train 37 and chain 39 to a drive wheel 41 of its associated truck. The motor 35 includes an associated brake 43. Supported on these two trucks, is a trolley frame 45 on which is carried the load hoist means.

Such load hoist means comprises the cargo container grappling or gripping means 51 in the form of a load frame 53 provided with two pairs of load sheaves 55, with each pair located at an end of the load frame.

Supported on the trolley frame 45 adjacent an end thereof and in approximately vertical alignment with one of the pairs of the load sheaves, is a hoist drum 61 rotatably driven by an electric motor 63 through a gear reducer 65 and a pinion and gear coupling 69 to the drum.

Anchored to the hoist drum are four load hoisting cables 71, one for each of the load sheaves 55, two of such cables passing directly downward and around the proximate load sheaves, with the free end of each such cable anchored to the trolley frame 45. The remaining two load hoisting cables pass over guide sheaves 75 supported adjacent the far end of the trolley frame, from where the cables pass down and around the proximate load sheaves to be similarly anchored to the trolley frame.

At one end 79 of the trolley frame, the frame is pivotally supported on the proximate wheeled truck 31 by a pivot pin 81 while at the other end 83 of the frame, the frame extends slightly beyond and overhangs the proximate supporting wheel truck 33 to which the frame at that end is connected by a crank 87, one end of which is pivotally connected to the overhanging or overextending end 83 of the trolley frame, while the other end of the crank is pivotally affixed to the supporting truck adjacent an end thereof, the specific location of which is determined by the position of the trolley frame normal to the girders 3 and 5.

The wheeled truck drive motors are selectively energizable, independently or in unison, from an operating station 91 located on the cross beam 15 of one of the U-frames, where an operator may have good control visibility of the load and the hoist mechanism. By energizing such motors in unison, the trolley assembly may be caused to travel along the girders of the crane, while maintaining its position normal to such girders.

On the other hand, by energizing the drive motor associated with the pivoted end 79 of the trolley frame, the trolley may be angularly adjusted about the swinging end of the crank 87 to which it is secured at the remote end 83 of the trolley frame, the crank in turn executing sufficient angular movement of its own about its fixed end to permit of such angular adjustment of the trolley frame.

The basic mechanism involved in the above-described cargo container handling equipment is quite simple and rugged, and permits of a desired manipulation of a cargo container load with a minimum of control, and in a very simple and effective manner. Through its use, a cargo container may be hoisted from the bed of the freight car, moved laterally to a position over a truck parked at substantially a 30° angle to the longitudinal of such freight car and by rotating the cargo container to the angular position of such truck, it may then be deposited upon the truck bed and the truck can be driven with its load regardless of similar activity taking place relative to adjacent cars of the train.

From the foregoing description of my invention in its preferred form, it will be apparent that the same fulfills all the objects of my invention, and while I have illustrated and described the same in its preferred form and in considerable detail, it will be apparent that the same is subject to alteration and modification without departing from the underlying principles involved, and I accordingly do not desire to be limited in my protection to these specific details illustrated and described, except as may be necessitated by the appended claims.

I claim:

1. Cargo handling equipment comprising a pair of spaced parallel rail supports, a rail on each of said supports, a wheeled truck on each of said rails, a frame of a length approximately the distance between said rails, means pivotally connecting said frame at one end to one of said wheeled trucks, crank means connecting the other end of same frame to the other wheeled truck, means carried by said frame for supporting cargo, and means for selectively driving said wheeled trucks, individually or simultaneously in either direction, and at the same or relatively different rates.

2. Cargo container handling equipment, comprising a pair of spaced parallel girders; a trolley assembly supportable on said parallel girders for movement therealong, said trolley assembly including a frame; means movably supporting said trolley assembly on said girders and permitting angular adjustment of said trolley assembly while so supported, said means including a wheeled support for one end of said trolley assembly adapted for travel along one of said girders, a wheeled support for the opposite end of said trolley assembly adapted for travel along the other of said girders, means including a pivotal connection between one end of said frame and the proximate wheeled support, a crank connection between the other end of said frame and its proximate wheeled support; and means for selectively driving either end of said frame along said girders in either direction and at the same or relatively different rate with respect to the other end, for enabling one to produce uniform travel of said trolley assembly along said girders in either direction or an angular swing of said trolley assembly in either direction about its pivoted end.

3. Cargo container handling equipment comprising a pair of spaced parallel girders; a trolley assembly supportable on said parallel girders for movement therealong; said trolley assembly including a frame and load hoist means carried by said frame; means movably supporting said trolley assembly on said girders and permitting angular adjustment of said trolley assembly while so supported, said means including a wheeled support for one end of said frame adapted for travel along one of said girders, a wheeled support for the opposite end of said frame adapted for travel along the other of said girders, means including a pivotal connection between one end of said frame and the proximate wheeled support, a crank connection between the other end of said frame and its proximate wheeled support; and means for selectively driving either end of said frame along said girders in either direction and at the same or relatively different rate with respect to the other end, for enabling one to produce uniform travel of said trolley assembly along said girders in either direction or an angular swing of said trolley assembly in either direction about its pivoted end.

4. Cargo container handling equipment comprising a pair of spaced parallel girders; a trolley assembly supportable on said parallel girders for movement therealong; said trolley assembly including a frame and load hoist means carried by said frame; means movably supporting said trolley assembly on said girders and permitting angular adjustment of said trolley assembly while so supported, said means including a wheeled support for one end of said frame adapted for travel along one of said girders, a wheel support for the opposite end of said frame adapted for travel along the other of said girders, means including a pivotal connection between one end of said frame and the proximate wheeled support, a crank connection between the other end of said frame and its proximate wheeled support; and means for selectively driving either end of said frame along said girders in either direction and at the same or relatively different rate with respect to the other end, for enabling one to produce uniform travel of said trolley assembly along said girders in either direction or an angular swing of said trolley assembly in either direction about its pivoted end, said driving means including independently controllable drive means for each of said wheeled supports.

5. Cargo container handling equipment comprising a gantry type crane having spaced parallel girders of a length sufficient to span a freight carrier such as a railroad or the like and a cargo container disposed alongside such carrier at an angle of the order of thirty degrees thereto; a trolley assembly supportable on said parallel girders for movement therealong between a position over such carrier and a position over an area alongside such carrier; said trolley assembly including a frame and load hoist means carried by said frame, said load hoist means comprising cargo container grappling means, a hoist drum on said frame, hoist cable means anchored to said drum and connected to said cargo container grappling means, and motor drive means coupled to said hoist drum; means movably supporting said trolley assembly on said girders and permitting angular adjustment of said trolley assembly while so supported, said means including a wheeled support for one end of said frame adapted for travel along one of said girders, a wheeled support for the opposite end of said frame adapted for travel along the other of said girders, means including a pivotal connection between one end of said frame and the proximate wheeled support, a crank connection between the other end of said frame and its proximate wheeled support; and means for selectively driving either end of said frame along said girders in either direction and at the same or relatively different rate with respect to the other end, for enabling one to produce uniform travel of said trolley assembly along said girders in either direction or an angular swing of said trolley assembly in either direction about its pivoted end, said driving means including independently controllable drive means for each of said wheeled supports.

6. Cargo container handling equipment comprising a gantry type crane having spaced parallel girders of a length sufficient to span a freight carrier such as a railroad or the like and a cargo container disposed alongside such carrier at an angle of the order of thirty degrees thereto; a trolley assembly supportable on said parallel girders for movement therealong between a position over such carrier and a position over an area alongside such carrier; said trolley assembly including a frame and load hoist means carried by said frame, said load hoist means comprising cargo container grappling means, a hoist drum on said frame, hoist cable means anchored to said drum and connected to said cargo container grappling means, and motor drive means coupled to said hoist drum; means movably supporting said trolley assembly on said girders and permitting angular adjustment of said trolley assembly while so supported, said means including a wheeled support for one end of said frame adapted for travel along one of said girders, a wheeled support for the opposite end of said frame adapted for travel along the other of said girders, means including a pivotal connection between one end of said frame and the proximate wheeled support, and a crank connection between the other end of said frame and a point on its proximate wheeled support asymetrical to the center of said support; and means for selectively driving either end of said trolley assembly along said girders in either direction and at the same or relatively different rate with respect to the other end, for enabling one to produce uniform travel of said trolley assembly along said girders in either direction or an angular swing of said trolley assembly in either direction about its pivoted end, said driving means including independently controllable drive means for each of said wheeled supports.

References Cited in the file of this patent

UNITED STATES PATENTS

| | | |
|---|---|---|
| 1,752,026 | Phillips | Mar. 25, 1930 |
| 2,063,909 | Fitch | Dec. 15, 1936 |
| 2,416,352 | Seward | Feb. 25, 1947 |
| 2,845,877 | Richter | Aug. 5, 1958 |
| 2,872,050 | Norwood | Feb. 3, 1959 |